United States Patent
Yamamoto et al.

(10) Patent No.: US 11,674,052 B2
(45) Date of Patent: Jun. 13, 2023

(54) LIGHT-SHIELDING PAINT, LIGHT-SHIELDING PAINT SET, LIGHT-SHIELDING FILM, OPTICAL ELEMENT, AND METHOD FOR PRODUCING OPTICAL ELEMENT

(71) Applicant: CANON KABUSHIKI KAISHA, Tokyo (JP)

(72) Inventors: Shuhei Yamamoto, Tokyo (JP); Yoji Teramoto, Yokohama (JP); Reiko Kubota, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 709 days.

(21) Appl. No.: 16/703,337

(22) Filed: Dec. 4, 2019

(65) Prior Publication Data
US 2020/0102470 A1    Apr. 2, 2020

Related U.S. Application Data

(62) Division of application No. 14/808,216, filed on Jul. 24, 2015, now abandoned.

(30) Foreign Application Priority Data

Jul. 28, 2014 (JP) .................. 2014-153298

(51) Int. Cl.
*C09D 163/00* (2006.01)
*G02B 5/00* (2006.01)
*C03C 17/00* (2006.01)
*C08K 3/22* (2006.01)
*C09D 5/00* (2006.01)

(52) U.S. Cl.
CPC .......... *C09D 163/00* (2013.01); *C03C 17/001* (2013.01); *C03C 17/009* (2013.01); *C08K 3/22* (2013.01); *C09D 5/00* (2013.01); *G02B 5/003* (2013.01); *C08K 2003/2241* (2013.01)

(58) Field of Classification Search
CPC ...................................... G02B 5/003
See application file for complete search history.

(56) References Cited

U.S. PATENT DOCUMENTS

2010/0226016 A1* 9/2010 Hirauchi ............ G03B 9/02
264/293

FOREIGN PATENT DOCUMENTS

WO    WO-2013021575 A2 * 2/2013 ........... C09D 163/00

* cited by examiner

*Primary Examiner* — Ian A Rummel
(74) *Attorney, Agent, or Firm* — Canon U.S.A., Inc., IP Division (57) ABSTRACT

An optical element has a lanthanum-containing glass substrate and a light-shielding film on part of the surface of the glass substrate. The light-shielding film is made from a light-shielding paint that contains at least an epoxy resin, fine particles of titania, a dye, an organic solvent, and an amine-based curing agent. The organic solvent in the light-shielding paint has a vapor pressure of 160 Pa or more and 960 Pa or less at a temperature of 20° C. The viscosity of the light-shielding paint is 10.0 mPa·s or more and 100 mPa·s or less.

17 Claims, 2 Drawing Sheets

LIGHT-SHIELDING PAINT, LIGHT-SHIELDING PAINT SET, LIGHT-SHIELDING FILM, OPTICAL ELEMENT, AND METHOD FOR PRODUCING OPTICAL ELEMENT

This Application is a divisional of pending U.S. patent application Ser. No. 14/808,216, filed Jul. 24, 2015, which claims priority to Japanese Patent Application No. 2014-153298, filed Jul. 28, 2014, which is hereby incorporated by reference in its entirety.

BACKGROUND OF THE INVENTION

Field of the Invention

The present invention relates to a light-shielding paint, a light-shielding paint set, and a light-shielding film which can all be applied to an optical element. The present invention also relates to an optical element. In particular, the present invention relates to a light-shielding paint and a light-shielding film that both include at least an epoxy resin, fine particles of titania, a coloring agent, and an organic solvent and to an optical element having this light-shielding film.

Description of the Related Art

Optical elements for optical equipment such as cameras, binoculars, microscopes, and semiconductor exposure devices optionally have a black light-shielding film outside their optically effective section to reduce stray light. This light-shielding film sufficiently absorbs stray light that reaches the periphery of a lens or any similar part of the optical element, reducing unnecessary lights, such as flares and ghosts.

A light-shielding film for an optical element is mainly a coating film formed on the surface of an optical component of the optical element, such as a glass component. The glass component can be a lens, a prism, or any other glass component for optical purposes.

Figure 3:
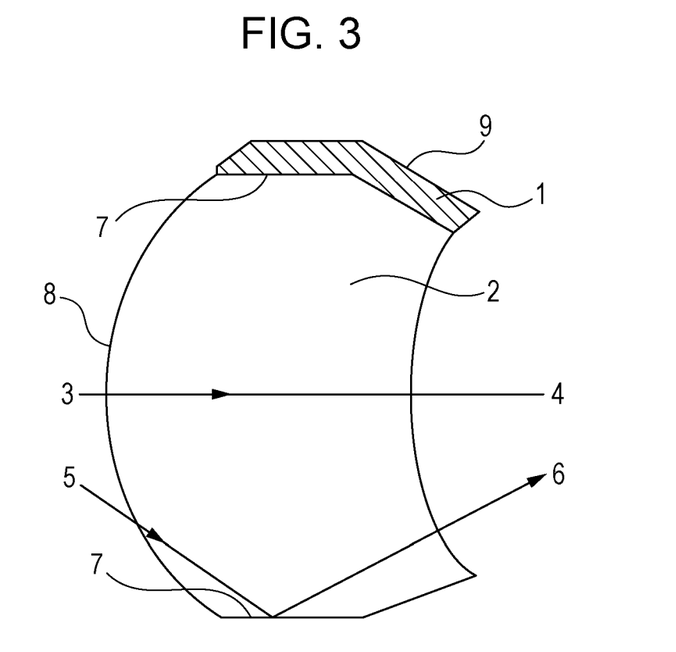
FIG. 3 is a schematic diagram illustrating an optical element having a light-shielding film for optical elements outside its optically effective plane.

The following describes the role of a light-shielding film for an optical element with reference to drawings. FIG. 3 is a schematic diagram illustrating an optical component that has a light-shielding film outside its optically effective plane. To be specific, FIG. 3 illustrates an example of a lens having a light-shielding film.

As illustrated in FIG. 3, the light-shielding film 1 is located at the periphery 7 (an edge having very small irregularities) of an out-of-plane area 9 (any area outside the optically effective plane 8) of the lens 2. A ray of light that enters through the optically effective plane 8 and only travels in the lens like the light 3 passes through the lens 2 as transmitted light 4. If no light-shielding film is provided (the lower side of the lens 2 in FIG. 3), a ray of light that hits the periphery of the lens 2 and reflects off the inner surface goes out of the lens 2 as irrelevant internal reflection light 6, causing a flare, a ghost, or any other event that affects the quality of the image. The light-shielding film 1 (the upper side of the lens 2 in FIG. 3) decreases the amount of internal reflection light 6 that affects the quality of the image and prevents flares and ghosts by reducing the internal reflection of diagonal incident light 5.

This light-shielding film is expected to reduce stray light that enters the light-shielding film from the inside of the optical element and is required to decrease the amount of internal reflection light 6.

The wide variety of shapes of optical elements having a light-shielding film has made more common the situations where the light-shielding film is located to be seen by the user of the optical element. Besides the aforementioned reduction of internal reflection, good appearance of the interface between the optical element and the light-shielding film as viewed by the user from the optical element side is in demand.

Furthermore, the recent miniaturization and progress in performance of optical equipment has led to frequent use of high-refractive-index materials to make optical elements for optical systems. To be specific, materials such as glass materials having a refractive index of 1.80 to more than 2.00 are used.

Reducing the internal reflection of stray light incident on a high-refractive-index optical element requires increasing the refractive index of the light-shielding film accordingly. An example of a known method for this is to control the refractive index of a light-shielding film by introducing a high-refractive-index component into the film.

Japanese Patent Laid-Open No. 2011-186437 discloses a light-shielding film for optical elements. To reduce internal reflection, this light-shielding film contains non-black inorganic fine particles that improve the refractive index and a dye that absorbs light.

The light-shielding paint according to Japanese Patent Laid-Open No. 2011-186437, however, is disadvantageous when used to form a light-shielding film on the periphery 7 of an optical element made of a high-refractive-index material. Some areas of the interface between the optical element and the light-shielding film look like emitting white light when viewed from the optical element side (white spots), affecting the appearance of the element.

Figure 4:
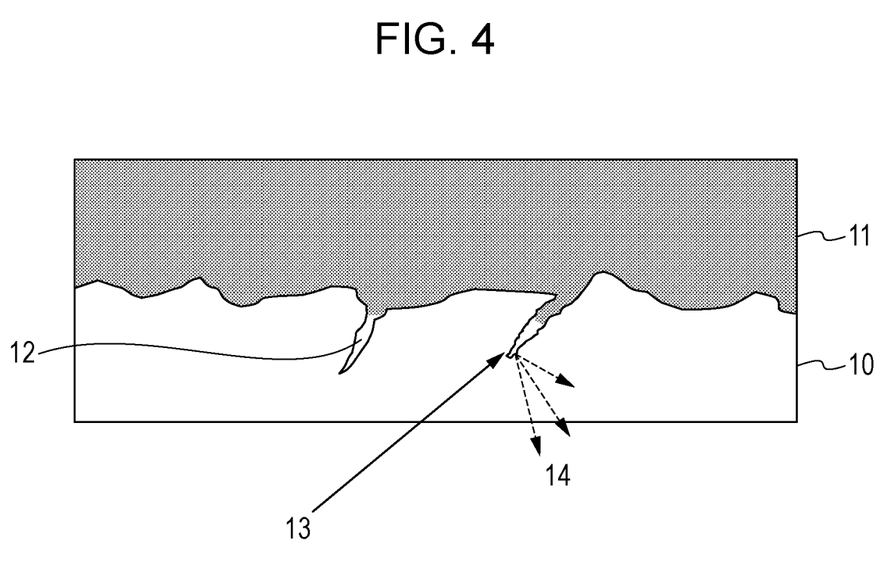
FIG. 4 is a diagram used to describe the cause of white spots that affects the appearance.

The following describes this problem. FIG. 4 is a cross-sectional view of the interface between an optical element 10 and a light-shielding film 11 on the periphery of the optical element 10. As illustrated in FIG. 4, many small cracks 12 are in the periphery (edge surface) of the optical element. Such cracks, developing while the edge surface is polished, are frequent when the optical element is made of a high-refractive-index glass material containing lanthanum or any similar element. The reason for the frequent occurrence of cracks in a high-refractive-index glass material should be that the lanthanum or other non-$SiO_2$ element added to the glass material as a refractive index enhancer affects the strength of intermolecular bonds (e.g., bonds between $SiO_2$ molecules), making the material more likely to crack when polished. Each crack usually measures 5 μm or less in width and 50 μm or less in length.

As illustrated in FIG. 4, a light-shielding paint applied to an edge surface having small cracks 12 to form the light-shielding film 11 only insufficiently fills the inside of the cracks 12, leaving air in the cracks 12. The difference between the refractive index of the air in the cracks 12 and that of the optical element 10 causes incident light 13 to diffusely reflect and produce scattered light 14. The resulting white spots on the interface between the optical element and the light-shielding film seen from the optical element side affect the appearance of the element. Worse yet, the high contrast between the black shielding film and the white spots makes the white spots conspicuous.

Made in light of such related art, an aspect of the present invention provides a light-shielding paint with which white spots on the interface between an optical element and a light-shielding film seen from the optical element side are prevented. Some other aspects of the present invention provide a light-shielding film, an optical element, and a method for producing an optical element that all ensure the prevention of white spots on the interface between an optical element and a light-shielding film seen from the optical element side.

SUMMARY OF THE INVENTION

An optical element according to an aspect of the invention has a lanthanum-containing glass substrate and a light-shielding film on part of the surface of the glass substrate. The light-shielding film is made from a light-shielding paint that contains at least an epoxy resin, fine particles of titania, a dye, an organic solvent, and an amine-based curing agent. The organic solvent in the light-shielding paint has a vapor pressure of 160 Pa or more and 960 Pa or less at a temperature of 20° C. The viscosity of the light-shielding paint is 10.0 mPa·s or more and 100 mPa·s or less.

A light-shielding paint according to an aspect of the invention contains at least an epoxy resin, fine particles of titania, a dye, an organic solvent, and an amine-based curing agent. The organic solvent has a vapor pressure of 160 Pa or more and 960 Pa or less at a temperature of 20° C. The viscosity of the light-shielding paint is 10.0 mPa·s or more and 100 mPa·s or less.

A light-shielding paint set according to an aspect of the invention for optical elements has two or more units including a unit having an epoxy resin and a unit having an amine-based curing agent. The light-shielding paint set contains fine particles of titania, a dye, and an organic solvent in any one or more of the units. A light-shielding paint as a mixture of all units in the light-shielding paint set has a vapor pressure of 160 Pa or more and 960 Pa or less at a temperature of 20° C. The viscosity of the light-shielding paint as a mixture of all units in the light-shielding paint set is 10.0 mPa·s or more and 100 mPa·s or less.

A light-shielding film according to an aspect of the invention is produced through the application and subsequent curing of the aforementioned light-shielding paint.

A method according to an aspect of the invention for producing an optical element having a lanthanum-containing glass substrate and a light-shielding film on part of the surface of the glass substrate includes applying a light-shielding paint to part of the surface of the glass substrate and curing the applied light-shielding paint. The light-shielding paint contains at least an epoxy resin, fine particles of titania, a dye, an organic solvent, and an amine-based curing agent. The light-shielding paint has a vapor pressure of 160 Pa or more and 960 Pa or less at a temperature of 20° C. The viscosity of the light-shielding paint is 10.0 mPa·s or more and 100 mPa·s or less.

Further features of the present invention will become apparent from the following description of exemplary embodiments with reference to the attached drawings.

DESCRIPTION OF THE EMBODIMENTS

The following describes some embodiments of the invention.

Figure 1:
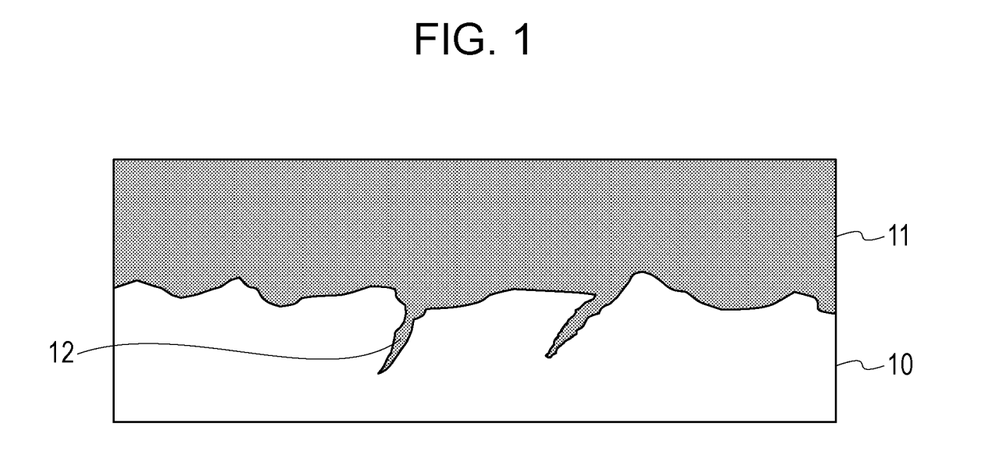
FIG. 1 is a diagram used to describe an exemplary embodiment of a light-shielding film according to an aspect of the invention for optical elements.

An optical element produced using a light-shielding paint according to an aspect of the invention sufficiently fills, as illustrated in FIG. 1, cracks that form in a ground periphery of an optical element, preventing light from scattering at the cracks. This makes the optical element relate to a light-shielding paint that produces a light-shielding film with few white spots noticeable on the element-film interface (the interface between the light-shielding film and the optical element on which it has been formed) viewed from the optical element side as well as to such a light-shielding film, an optical element having such a light-shielding film, and a method for producing such an optical element.

The following describes some embodiments of the invention with reference to drawings.

Light-Shielding Paint

A light-shielding paint according to an embodiment of the invention is first described.

The light-shielding paint according to this embodiment is a light-shielding paint for optical elements that contains an epoxy resin, fine particles of titania, a dye, and an organic solvent.

The viscosity of the light-shielding paint according to this embodiment can be 10.0 mPa·s or more and 100 mPa·s or less. A viscosity of less than 10 mPa·s makes the light-shielding paint likely to move while drying, affecting its ease of application. A viscosity of more than 100 mPa·s of the light-shielding paint leads to poor filling in cracks that form in the periphery (edge) of an optical element, resulting in incomplete prevention of white spots.

The following describes materials contained in the light-shielding paint according to this embodiment.

Epoxy Resin

Any one or two or more known epoxy resins can be used in the light-shielding paint according to this embodiment as long as they ensure the dispersibility of the fine particles of titania, are compatible with the dye, can be cured with the amine-based curing agent, will be stable in a coating, and allow the paint to adhere firmly to a substrate. Specific examples of epoxy resins that can be used include glycidyl-ether, glycidyl-ester, and glycidyl-amine epoxy resins, linear aliphatic epoxides, and alicyclic epoxides. In particular, it is preferred to use a bisphenol A epoxy resin.

The use of an epoxy resin having a high refractive index improves the refractive index of light-shielding films made from the light-shielding paint.

The epoxy resin content of the light-shielding paint according to this embodiment can be 5.0% by mass or more and 50.0% by mass or less, preferably 10.0% by mass or more and 40.0% by mass or less.

Fine Particles of Titania

With their high refractive index, the fine particles of titania used in the light-shielding paint according to this embodiment allow easy adjustment of the refractive index of light-shielding films to the desired value. They are also widely available in the market at affordable prices with a sufficient degree of fineness.

The quantity of the fine particles of titania in the light-shielding paint according to this embodiment can be 20.0% by mass or more and 60.0% by mass or less, preferably 20.0% by mass or more and 55.0% by mass or less. The fine particles of titania insufficiently increase the refractive index of light-shielding films when being less than 20.0% by mass.

When being more than 60.0% by mass, the fine particles of titania cause the films to be of insufficient quality for use as light-shielding films.

The average particle diameter of the primary particles of the fine particles of titania used in this embodiment can be 1.0 nm or more and 100 nm or less, preferably 1.0 nm or more and 70 nm or less. Fine particles of titania with an average particle diameter of less than 1 nm have extremely large surface areas, which make the fine particles very likely to aggregate and difficult to disperse well. Particles having an average particle diameter of more than 100 nm behave as light scatterers and cause films made from the paint to perform insufficiently as light-shielding films. The average primary particle diameter as mentioned herein refers to the equivalent spherical diameter of non-aggregated particles. The average primary particle diameter of the fine particles of titania is their number-average particle diameter.

Any known method, such as a vapor-phase or liquid-phase process, can be used to produce the fine particles of titania used in this embodiment. Examples include known methods such as synthesizing fine particles of titanium dioxide by burning a metal powder in a flame in an atmosphere containing at least oxygen and a sol-gel process in which a titanium alkoxide undergoes hydrolysis and condensation polymerization. Titania, known to have crystalline structures such as the rutile structure and anatase structure, exhibits a high refractive index as compared with that of amorphous structures. Any crystallographic form of titania, however, can be used as long as it has an intended refractive index.

Dye

Any known dye can be used in the light-shielding paint according to this embodiment as long as it has an absorption band in the visible range, is compatible with the epoxy resin, and ensures the dispersibility of the fine particles of titania. Besides the use of a single dye, it is possible to use a combination of dyes in different colors, such as black, red, yellow, and blue, to adjust the absorption wavelengths. Azo dyes are available in a wide variety of colors, and examples of other dyes that can be used include anthraquinone dyes, phthalocyanine dyes, stilbenzene dyes, pyrazolone dyes, thiazole dyes, carbonium dyes, and azine dyes. Dyes are more resistant to external influences such as light, water, and heat when containing chromium, cobalt, copper, or any similar metal than in their original form.

The dye content of the light-shielding paint according to this embodiment can be 5.0% by mass or more and 30.0% by mass or less, preferably 10.0% by mass or more and 15.0% by mass or less.

Organic Solvent

The organic solvent used in this embodiment may have a vapor pressure of 160 Pa or more and 960 Pa or less at a temperature of 20° C. A vapor pressure of less than 160 Pa of the organic solvent at a temperature of 20° C. causes the light-shielding paint to move on the optical element to which it has been applied, making it difficult to form a uniform light-shielding film from the paint. A vapor pressure of more than 960 Pa of the organic solvent at a temperature of 20° C. causes a coating of the light-shielding paint applied to an optical element to dry into a light-shielding film too fast to sufficiently fill cracks in the edge surface of the optical element, making it more likely that white spots are noticeable on the element-film interface viewed from the optical element side.

The organic solvent used in this embodiment may be a mixture of a first organic solvent and a second organic solvent.

The first organic solvent used in the light-shielding paint according to this embodiment has a boiling point of 150° C. or more and 210° C. or less. A boiling point of less than 150° C. of the first organic solvent causes a coating of the light-shielding paint applied to an optical element to dry into a light-shielding film too fast to sufficiently fill cracks in the edge surface of the optical element, making it more likely that noticeable white spots are on the element-film interface viewed from the optical element side. When having a boiling point of more than 210° C., the first organic solvent affects the chemical resistance of light-shielding films by remaining in the films.

The first organic solvent can be a solvent that dissolves the essential components of the paint, such as an epoxy resin and a dye, preferably with good compatibility with the fine particles of titania. Specific examples include benzyl alcohol (boiling point, 205° C.; vapor pressure at 20° C., 13 Pa), 2-ethyl-1-hexanol (boiling point, 185° C.; vapor pressure at 20° C., 48 Pa), butyl cellosolve (boiling point, 171° C.; vapor pressure at 20° C., 100 Pa), 1-butoxy-2-propanol (boiling pint, 170° C.; vapor pressure at 20° C., 640 Pa), and mixtures of these solvents.

The total quantity of the first organic solvent and the second organic solvent (described hereinafter) in the light-shielding paint according to this embodiment can be 5.0% by mass or more and 70.0% by mass or less, preferably 10.0% by mass or more and 50.0% by mass or less.

The second organic solvent can be propylene glycol monomethyl ether (boiling point, 119° C.; vapor pressure at 20° C., 1200 Pa).

Amine-Based Curing Agent

The light-shielding paint according to this embodiment contains an amine-based curing agent with which the epoxy resin in the light-shielding paint is cured. Any known amine-based curing agent can be used as long as intended characteristics are ensured. Examples of amine-based curing agents that can be used include linear aliphatic ones, polyamide-based ones, alicyclic ones, and aromatic ones, as well as dicyandiamide, adipic acid dihydrazide, and so forth. Any one of these can be used alone, and it is also possible to use a mixture of two or more of these.

The amine-based curing agent content of the light-shielding paint according to this embodiment can be 1.0% by mass or more and 25.0% by mass or less of the light-shielding paint. An amine-based curing agent content of less than 1.0% by mass causes the degree of hardening of light-shielding films to be so low that the adhesion of the films to their substrate is affected. An amine-based curing agent content of more than 25.0% by mass leads to low optical characteristics.

Inorganic Fine Particles

The light-shielding paint according to this embodiment may contain inorganic fine particles other than the fine particles of titania, such as silica (hydrophobic silica, hydrophilic silica, or a mixture of them). The user can control the ease of application of the light-shielding paint by adding inorganic fine particles like silica. Such inorganic fine particles can also be used to form creases or irregularities on the surface of a light-shielding film that reduce the reflection of light at the interface between the film and the air.

The quantity of the inorganic fine particles in the light-shielding paint according to this embodiment can be 2.0% by mass or more and 20.0% by mass or less, preferably 2.0% by mass or more and 15.0% by mass or less. The inorganic fine particles often have insufficient effects on the ease of application of the paint and insufficiently reduce the reflection of light at the interface between a light-shielding film and the air when being less than 2.0% by mass. When being more than 20.0% by mass, the inorganic fine particles often cause films made from the paint to be of insufficient quality for use as light-shielding films.

The average primary particle diameter of the inorganic fine particles can be 20 nm or more and 200 nm or less, preferably 20 nm or more and 150 nm or less. Inorganic fine particles having an average primary particle diameter of less than 20 nm often have insufficient effects on the ease of application of the paint and insufficiently reduce the reflection of light at the interface between a light-shielding film and the air. Inorganic fine particles having an average particle diameter of more than 200 nm behave as light scatterers and cause films made from the paint to perform insufficiently as light-shielding films.

Additives

The light-shielding paint according to this embodiment may contain additives as long as the paint can be used for its intended purpose. Examples of additives that can be used include substances such as plasticizers, coupling agents, flame retardants (e.g., phosphates and melamines), surfactants (e.g., those based on aliphatic acid esters), antistatic agents such as alkyl sulfonates and glyceryl stearates, oxidation inhibitors, fungicides, and preservatives. Any one of these additives can be used alone, and it is also possible to use two or more of these in combination.

The additive content of the light-shielding paint according to this embodiment can be 0.1% by mass or more and 10% by mass or less, preferably 0.1% by mass or more and 8.0% by mass or less.

Light-Shielding Paint Set

The following describes a light-shielding paint set according to an embodiment of the invention.

The light-shielding paint set according to this embodiment has two or more units including a unit having an epoxy resin and a unit having an amine-based curing agent. Mixing all units produces a light-shielding paint described above.

The light-shielding paint set according to this embodiment is a light-shielding paint set for optical elements that has two or more units including a unit having an epoxy resin and a unit having an amine-based curing agent. The light-shielding paint set according to this embodiment contains at least fine particles of titania, a dye, a first organic solvent, a second organic solvent, and an amine-based curing agent in any one or more of the units. The organic solvent in the light-shielding paint as a mixture of all units may have a vapor pressure of 160 Pa or more and 960 Pa or less at a temperature of 20° C. The viscosity of the light-shielding paint as a mixture of all units in the light-shielding paint set can be 10.0 mPa·s or more and 100 mPa·s or less.

The light-shielding paint set according to this embodiment can contain the materials described in "Light-shielding paint" in any unit so that mixing all units produces a light-shielding paint described above.

Light-Shielding Film

The following describes a light-shielding film according to an embodiment of the invention.

The light-shielding film according to this embodiment is produced through the application and subsequent curing of a light-shielding paint described above. The composition of the light-shielding film is the same as that of the light-shielding paint but excludes the organic solvent. The light-shielding film according to this embodiment therefore contains at least an epoxy resin, fine particles of titania, a dye, and an amine-based curing agent, optionally with any other materials mentioned above for a light-shielding paint.

The thickness of the light-shielding film according to this embodiment is not limited. It can be 0.5 μm or more and 100 μm or less, preferably 1 μm or more and 50 μm or less.

The light-shielding film according to this embodiment may have an absorption coefficient of 0.03 or more and 0.15 or less and a refractive index (nd) of 1.69 or more. An absorption coefficient of less than 0.03 makes the light-shielding film insufficiently absorb light. An absorption coefficient of more than 0.15 leads to serious scattering, affecting the performance of the film in shielding light. When the light-shielding film is formed on a highly refractive optical element, a refractive index (nd) of less than 1.69 causes serious internal reflection to occur because of the difference between the refractive index of the optical element and that of the light-shielding film.

The following describes the quantities of the individual materials in the light-shielding film.

Epoxy Resin

The epoxy resin content of the light-shielding film according to this embodiment can be 5.0% by mass or more and 40.0% by mass or less, preferably 10.0% by mass or more and 30.0% by mass or less.

Fine Particles of Titania

The quantity of the fine particles of titania in the light-shielding film according to this embodiment can be 5.0% by mass or more and 35.0% by mass or less, preferably 10.0% by mass or more and 30.0% by mass or less. The fine particles of titania increase the refractive index of the resulting thin film only to a small extent, leading to large internal reflection, when being less than 5.0% by mass.

Dye

The dye content of the light-shielding film according to this embodiment can be 5.0% by mass or more and 40.0% by mass or less, preferably 10.0% by mass or more and 30.0% by mass or less.

Amine-Based Curing Agent

The amine-based curing agent content of the light-shielding film according to this embodiment can be 1.0% by mass or more and 30.0% by mass or less of the light-shielding paint. An amine-based curing agent content of less than 1.0% by mass causes the degree of hardening of the light-shielding film to be so low that the adhesion of the film to its substrate is affected. An amine-based curing agent content of more than 30.0% by mass leads to low optical characteristics.

Inorganic Fine Particles

The quantity of inorganic fine particles in the light-shielding film according to this embodiment other than the fine particles of titania can be 5.0% by mass or more and 40.0% by mass or less, preferably 10.0% by mass or more and 30.0% by mass or less.

Additives

The additive content of the light-shielding film according to this embodiment can be 0.1% by mass or more and 15% by mass or less, preferably 0.1% by mass or more and 10.0% by mass or less.

Optical Element

An optical element according to an embodiment of the invention has a lanthanum-containing glass substrate and a light-shielding film on part of the surface of the glass substrate. The light-shielding film is the aforementioned light-shielding film according to an embodiment of the invention.

The glass substrate can be a lens or a prism. The refractive index (refractive index at d line) can be 1.60 or more and 2.00 or less, preferably 1.80 or more and 2.00 or less.

The optical element according to this embodiment can be used as a lens, a prism, a reflector, a diffraction grating, or any other constitutive element of optical equipment. For example, the optical element according to this embodiment may be an optical element for any of cameras, binoculars, microscopes, and semiconductor exposure devices. In such equipment, the optical element can be used as an optical element having a light-shielding film outside its optically effective plane.

The optical element according to this embodiment has few white spots noticeable on the element-film interface viewed from the optical element side even when the lens or prism contains 10% by number of cations or more and 60% by number of cations or less. The optical element according to this embodiment has few white spots even when it has the light-shielding film on a ground periphery (edge surface) of the lens or prism.

Method for Producing an Optical Element

A method according to an embodiment of the invention for producing an optical element is a method for producing an optical element having a lanthanum-containing glass substrate and a light-shielding film on part of the surface of the glass substrate. The method includes applying a light-shielding paint and curing the applied light-shielding paint. The light-shielding paint used in the method according to this embodiment for producing an optical element is a light-shielding paint described above. The method according to this embodiment for producing an optical element may include preparing the light-shielding paint before the application of the paint. The materials, conditions, and so forth mentioned above for an optical element can be used in the method according to this embodiment for producing an optical element. The following describes the individual steps.

Preparation of the Light-Shielding Paint

The light-shielding paint used in the method according to this embodiment for producing an optical element may be prepared through the mixing and dispersion of the materials mentioned above for a light-shielding paint. Examples of mixing and dispersion methods that can be used include a ball mill, a bead mill, an impact disperser, a planetary mixer, a homogenizer, and a stirrer.

The fine particles of titania may be nano-dispersed before use. A specific example of a method for nano-dispersion is to disperse the fine particles into nanoparticles using equipment such as a bead mill or an impact disperser. Alternatively, the fine particles of titania may be synthesized as in the form of nanoparticles through a sol-gel process. It is also possible to use commercially available nano-dispersed particles.

Application of the Light-Shielding Paint

The application of the light-shielding paint includes applying an aforementioned light-shielding paint according to an embodiment of the invention to part of the surface of a glass substrate.

The light-shielding paint can be applied using any known method selected in accordance with the intended shape of the coating, such as dipping, spin coating, slit coating, electrostatic coating, and the use of coating jigs such as a brush, sponge, and a bar coater.

Curing of the Light-Shielding Paint

The curing of the light-shielding paint includes curing the applied paint. The light-shielding paint can be cured through the drying of the applied paint. It is also possible to cure the light-shielding paint by firing the applied paint.

If the paint is dried, the temperature for drying can be 20° C. or more and 100° C. or less, preferably 40° C. or more and 80° C. or less, more preferably 40° C. or more and 60° C. or less. The duration of drying can be 10 minutes or more and 24 hours or less, preferably 30 minutes or more and 24 hours or less, more preferably 1 hour or more and 24 hours or less. If the paint is fired, the temperature for firing can be 40° C. or more and 300° C. or less, preferably 40° C. or more and 250° C. or less, more preferably 40° C. or more and 200° C. or less. The duration of firing can be 10 minutes or more and 10 hours or less, preferably 10 minutes or more and 6 hours or less.

EXAMPLES

The following describes certain aspects of the invention in more detail by providing examples and comparative examples. No aspect of the invention is limited to these examples. The inspection for white spots and the assessments for vapor pressure and ease of application of light-shielding paints in the Examples and Comparative Examples were conducted as follows.

Visual Inspection for White Spots

Figure 2:
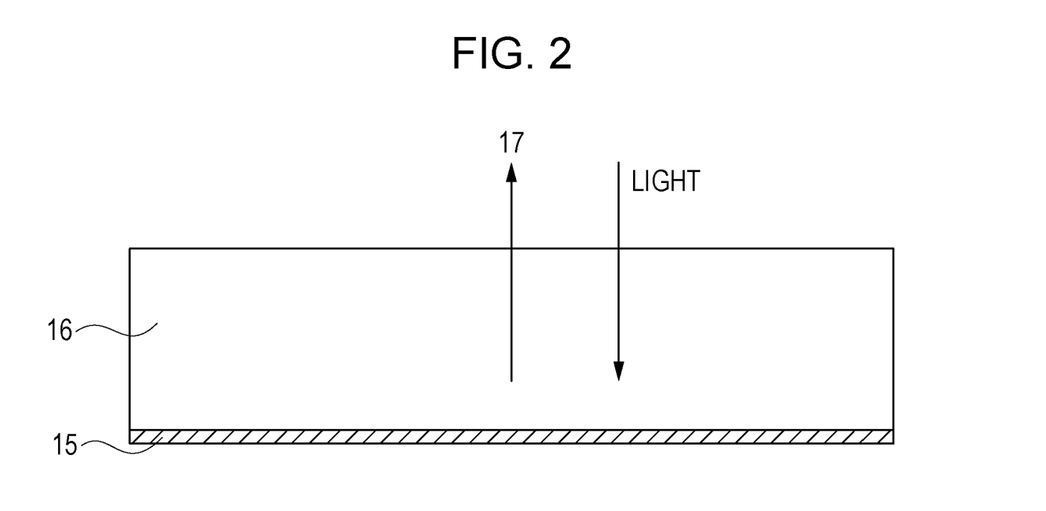
FIG. 2 is a schematic diagram illustrating the method for visual inspection used in the Examples.

A light-shielding film 15 was formed on a flat glass plate through the application of a light-shielding paint as illustrated in FIG. 2. The white spots on the interface between the light-shielding film and the glass plate were imaged using a CCD camera 17 under light from the glass plate 16 side. The obtained image was processed using image analysis software (Media Cybernetics Image-Pro Plus), and spots that had an area of 20 $\mu m^2$ or more and looked like emitting white light were counted in a field of 6 $mm^2$.

The criteria for the visual inspection were as follows. If the average number of white spots on the light-shielding film was 300 or less, the optical element was judged good in appearance (A). If the average number of white spots was 301 or more, the optical element was judged not to be sufficiently good in appearance (B or C).

The substrate for inspection samples was a flat plate of S-LAH66 glass material [trade name] (OHARA Inc.), which contained 45% lanthanum by number of cations. A rough surface of this flat glass plate was polished using a #120 sanding material. A light-shielding paint was applied to the polished surface to a thickness that would be 5 $\mu m$ after firing. After 1-hour drying at room temperature, the coating was fired at 140° C. for 2 hours to form a light-shielding film.

Assessment of Light-Shielding Paints for the Vapor Pressure at 20° C.

Light-shielding paints for optical elements were assessed for the vapor pressure at 20° C. using the static method. The static method is a technique in which the equilibrium vapor pressure of a liquid is directly measured using a manometer at a constant temperature.

Assessment of Light-Shielding Paints for the Viscosity at 20° C.

Light-shielding paints for optical elements were assessed for the viscosity at 20° C. through the measurement of viscosity using SV-1H tuning-fork vibration viscometer [trade name] (A&D Co., Ltd.) at a constant temperature.

Assessment of Light-Shielding Paints for Ease of Application

Light-shielding paints for optical elements were assessed for ease of application through the measurement of their displacement on a flat glass plate during drying. First, three strips of Kapton tape (10 mm×100 mm×0.065 mm each) were attached in a stack to both ends of a flat glass plate (30 mm×100 mm×1 mm) to make a sample with a difference in level (0.195 mm) between the flat plate glass and the Kapton tape.

A light-shielding paint for optical elements was uniformly applied to a coating area (10 mm×100 mm×0.196 mm) of the sample flat plate using a slide coater. After 1-hour drying, the displacement of the paint was measured. If the displacement was 1 mm or less, the light-shielding paint was judged easy to apply (A). If the displacement was more than 1 mm, the paint was judged not to be sufficiently easy to apply (C) as it would be difficult to form a uniform film from the paint.

Example 1

The following materials were stirred in a stirring vessel using HM-500 planetary mixer [trade name] (Keyence) for 20 minutes: 7.0 g of jER828 epoxy resin [trade name] (Mitsubishi Chemical), 40.0 g of ND139 titania dispersion [trade name] (TAYCA Corporation; a dispersion of titania in PGME; titania concentration, 25% by mass), 1.2 g of VALIFAST-BLACK 3810 [trade name] (dye (1); Orient Chemical Industries), 3.0 g of VALIFAST-RED 3320 [trade name] (dye (2); Orient Chemical Industries), 1.2 g of VALIFAST-YELLOW 3108 [trade name] (dye (3); Orient Chemical Industries), 3.8 g of VALIFAST-BLUE 2620 [trade name] (dye (4); Orient Chemical Industries), 22.0 g of 1-butoxy-2-propanol (an organic solvent; Kishida Chemical), 3.2 g of Aerosil R972 [trade name] ((1) hydrophobic silica; Nippon Aerosil), 1.3 g of Aerosil 200 [trade name] ((2) hydrophilic silica; Nippon Aerosil), and 0.5 g of 2-(4'-thiazolyl)benzimidazole [trade name] (SC Environmental Science). Nine grams of the resulting light-shielding paint was stirred with 0.1 g of EH-6019 epoxy resin curing agent [trade name] (ADEKA) using HM-500 planetary mixer [trade name] (Keyence) for 3 minutes.

The vapor pressure of the obtained light-shielding paint at 20° C. was measured to be 960 Pa under the above-described conditions.

Separately, the light-shielding paint was applied to the aforementioned rough surface of a flat glass plate to a thickness that would be 5 μm after firing. After 1-hour drying at room temperature and 2-hour firing at 140° C. in a thermostatic oven, the resulting film was inspected for white spots under the above-described conditions.

The light-shielding paint was also subjected to the aforementioned assessment for ease of application.

Data on this light-shielding paint are presented in Table 1. The results of the visual inspection of the obtained light-shielding film and optical element for white spots and the assessment for ease of application are presented in Table 3.

Example 2

The following materials were stirred in a stirring vessel using HM-500 planetary mixer [trade name] (Keyence) for 20 minutes: 7.0 g of jER828 epoxy resin [trade name] (Mitsubishi Chemical), 40.0 g of ND139 titania dispersion [trade name] (TAYCA Corporation; a dispersion of titania in PGME; titania concentration, 25% by mass), 1.2 g of VALIFAST-BLACK 3810 [trade name] (dye (1); Orient Chemical Industries), 3.0 g of VALIFAST-RED 3320 [trade name] (dye (2); Orient Chemical Industries), 1.2 g of VALIFAST-YELLOW 3108 [trade name] (dye (3); Orient Chemical Industries), 3.8 g of VALIFAST-BLUE 2620 [trade name] (dye (4); Orient Chemical Industries), 50.0 g of 1-butoxy-2-propanol (an organic solvent; Kishida Chemical), 3.2 g of Aerosil R972 [trade name] ((1) hydrophobic silica; Nippon Aerosil), 1.3 g of Aerosil 200 [trade name] ((2) hydrophilic silica; Nippon Aerosil), and 0.5 g of 2-(4'-thiazolyl)benzimidazole [trade name] (SC Environmental Science). Nine grams of the resulting light-shielding paint was stirred with 0.1 g of EH-6019 epoxy resin curing agent [trade name] (ADEKA) using HM-500 planetary mixer [trade name] (Keyence) for 3 minutes.

The vapor pressure of the obtained light-shielding paint for optical elements at 20° C. was measured to be 850 Pa under the above-described conditions.

Data on this light-shielding paint are presented in Table 1. The results of the visual inspection of the obtained light-shielding film and optical element for white spots and the assessment for ease of application are presented in Table 3.

Example 3

The following materials were stirred in a stirring vessel using HM-500 planetary mixer [trade name] (Keyence) for 20 minutes: 7.0 g of jER828 epoxy resin [trade name] (Mitsubishi Chemical), 40.0 g of ND139 titania dispersion [trade name] (TAYCA Corporation; a dispersion of titania in PGME; titania concentration, 25% by mass), 1.2 g of VALIFAST-BLACK 3810 [trade name] (dye (1); Orient Chemical Industries), 3.0 g of VALIFAST-RED 3320 [trade name] (dye (2); Orient Chemical Industries), 1.2 g of VALIFAST-YELLOW 3108 [trade name] (dye (3); Orient Chemical Industries), 3.8 g of VALIFAST-BLUE 2620 [trade name] (dye (4); Orient Chemical Industries), 50.0 g of 2-ethyl-1-hexanol (an organic solvent; Kishida Chemical), 3.2 g of Aerosil R972 [trade name] ((1) hydrophobic silica; Nippon Aerosil), 1.3 g of Aerosil 200 [trade name] ((2) hydrophilic silica; Nippon Aerosil), and 0.5 g of 2-(4'-thiazolyl)benzimidazole [trade name] (SC Environmental Science). Nine grams of the resulting light-shielding paint was stirred with 0.1 g of EH-6019 epoxy resin curing agent [trade name] (ADEKA) using HM-500 planetary mixer [trade name] (Keyence) for 3 minutes.

The vapor pressure of the obtained light-shielding paint for optical elements at 20° C. was measured to be 480 Pa under the above-described conditions.

Data on this light-shielding paint are presented in Table 1. The results of the visual inspection of the obtained light-shielding film and optical element for white spots and the assessment for ease of application are presented in Table 3.

Example 4

The following materials were stirred in a stirring vessel using HM-500 planetary mixer [trade name] (Keyence) for 20 minutes: 7.0 g of jER828 epoxy resin [trade name] (Mitsubishi Chemical), 40.0 g of ND139 titania dispersion [trade name] (TAYCA Corporation; a dispersion of titania in PGME; titania concentration, 25% by mass), 1.2 g of VALIFAST-BLACK 3810 [trade name] (dye (1); Orient Chemical Industries), 3.0 g of VALIFAST-RED 3320 [trade name] (dye (2); Orient Chemical Industries), 1.2 g of VALIFAST-YELLOW 3108 [trade name] (dye (3); Orient Chemical Industries), 3.8 g of VALIFAST-BLUE 2620 [trade name] (dye (4); Orient Chemical Industries), 50 g of butyl cellosolve (an organic solvent; Kishida Chemical), 3.2 g of Aerosil R972 [trade name] ((1) hydrophobic silica; Nippon Aerosil), 1.3 g of Aerosil 200 [trade name] ((2) hydrophilic silica; Nippon Aerosil), and 0.5 g of 2-(4'-thiazolyl)benzimidazole [trade name] (SC Environmental Science). Nine grams of the resulting light-shielding paint was stirred with 0.1 g of EH-6019 epoxy resin curing agent

[trade name] (ADEKA) using HM-500 planetary mixer [trade name] (Keyence) for 3 minutes.

The vapor pressure of the obtained light-shielding paint for optical elements at 20° C. was measured to be 513 Pa under the above-described conditions.

Data on this light-shielding paint are presented in Table 1. The results of the visual inspection of the obtained light-shielding film and optical element for white spots and the assessment for ease of application are presented in Table 3.

Example 5

The following materials were stirred in a stirring vessel using HM-500 planetary mixer [trade name] (Keyence) for 20 minutes: 7.0 g of jER828 epoxy resin [trade name] (Mitsubishi Chemical), 12.0 g of ND139 titania dispersion [trade name] (TAYCA Corporation; a dispersion of titania in PGME; titania concentration, 25% by mass), 1.2 g of VALIFAST-BLACK 3810 [trade name] (dye (1); Orient Chemical Industries), 3.0 g of VALIFAST-RED 3320 [trade name] (dye (2); Orient Chemical Industries), 1.2 g of VALIFAST-YELLOW 3108 [trade name] (dye (3); Orient Chemical Industries), 3.8 g of VALIFAST-BLUE 2620 [trade name] (dye (4); Orient Chemical Industries), 60.0 g of benzyl alcohol (an organic solvent; Kishida Chemical), 3.2 g of Aerosil R972 [trade name] ((1) hydrophobic silica; Nippon Aerosil), 1.3 g of Aerosil 200 [trade name] ((2) hydrophilic silica; Nippon Aerosil), and 0.5 g of 2-(4'-thiazolyl)benzimidazole [trade name] (SC Environmental Science). Nine grams of the resulting light-shielding paint was stirred with 0.1 g of EH-6019 epoxy resin curing agent [trade name] (ADEKA) using HM-500 planetary mixer [trade name] (Keyence) for 3 minutes.

The vapor pressure of the obtained light-shielding paint for optical elements at 20° C. was measured to be 168 Pa under the above-described conditions.

Data on this light-shielding paint are presented in Table 1. The results of the visual inspection of the obtained light-shielding film and optical element for white spots and the assessment for ease of application are presented in Table 3.

Comparative Example 1

The following materials were stirred in a stirring vessel using HM-500 planetary mixer [trade name] (Keyence) for 20 minutes: 7.0 g of jER828 epoxy resin [trade name] (Mitsubishi Chemical), 12.0 g of ND139 titania dispersion [trade name] (TAYCA Corporation; a dispersion of titania in PGME; titania concentration, 25% by mass), 1.2 g of VALIFAST-BLACK 3810 [trade name] (dye (1); Orient Chemical Industries), 3.0 g of VALIFAST-RED 3320 [trade name] (dye (2); Orient Chemical Industries), 1.2 g of VALIFAST-YELLOW 3108 [trade name] (dye (3); Orient Chemical Industries), 3.8 g of VALIFAST-BLUE 2620 [trade name] (dye (4); Orient Chemical Industries), 65.0 g of hexamethylphosphoric triamide (an organic solvent; Showa Chemical), 3.2 g of Aerosil R972 [trade name] ((1) hydrophobic silica; Nippon Aerosil), 1.3 g of Aerosil 200 [trade name] ((2) hydrophilic silica; Nippon Aerosil), and 0.5 g of 2-(4'-thiazolyl)benzimidazole [trade name] (SC Environmental Science). Nine grams of the resulting light-shielding paint was stirred with 0.1 g of EH-6019 epoxy resin curing agent [trade name] (ADEKA) using HM-500 planetary mixer [trade name] (Keyence) for 3 minutes.

The vapor pressure of the obtained light-shielding paint for optical elements at 20° C. was measured to be 150 Pa under the above-described conditions.

Data on this light-shielding paint are presented in Table 2. The results of the visual inspection of the obtained light-shielding film and optical element for white spots and the assessment for ease of application are presented in Table 3.

Comparative Example 2

The following materials were stirred in a stirring vessel using HM-500 planetary mixer [trade name] (Keyence) for 20 minutes: 7.0 g of jER828 epoxy resin [trade name] (Mitsubishi Chemical), 40.0 g of ND139 titania dispersion [trade name] (TAYCA Corporation; a dispersion of titania in PGME; titania concentration, 25% by mass), 1.2 g of VALIFAST-BLACK 3810 [trade name] (dye (1); Orient Chemical Industries), 3.0 g of VALIFAST-RED 3320 [trade name] (dye (2); Orient Chemical Industries), 1.2 g of VALIFAST-YELLOW 3108 [trade name] (dye (3); Orient Chemical Industries), 3.8 g of VALIFAST-BLUE 2620 [trade name] (dye (4); Orient Chemical Industries), 22.0 g of propylene glycol monomethyl ether (an organic solvent; Kishida Chemical), 3.2 g of Aerosil R972 [trade name] ((1) hydrophobic silica; Nippon Aerosil), 1.3 g of Aerosil 200 [trade name] ((2) hydrophilic silica; Nippon Aerosil), and 0.5 g of 2-(4'-thiazolyl)benzimidazole [trade name] (SC Environmental Science). Nine grams of the resulting light-shielding paint was stirred with 0.1 g of EH-6019 epoxy resin curing agent [trade name] (ADEKA) using HM-500 planetary mixer [trade name] (Keyence) for 3 minutes.

The vapor pressure of the obtained light-shielding paint for optical elements at 20° C. was measured to be 1200 Pa under the above-described conditions.

Data on this light-shielding paint are presented in Table 2. The results of the visual inspection of the obtained light-shielding film and optical element for white spots and the assessment for ease of application are presented in Table 3.

Comparative Example 3

The following materials were stirred in a stirring vessel using HM-500 planetary mixer [trade name] (Keyence) for 20 minutes: 7.0 g of jER828 epoxy resin [trade name] (Mitsubishi Chemical), 40.0 g of ND139 titania dispersion [trade name] (TAYCA Corporation; a dispersion of titania in PGME; titania concentration, 25% by mass), 1.2 g of VALIFAST-BLACK 3810 [trade name] (dye (1); Orient Chemical Industries), 3.0 g of VALIFAST-RED 3320 [trade name] (dye (2); Orient Chemical Industries), 1.2 g of VALIFAST-YELLOW 3108 [trade name] (dye (3); Orient Chemical Industries), 3.8 g of VALIFAST-BLUE 2620 [trade name] (dye (4); Orient Chemical Industries), 22.0 g of toluene (an organic solvent; Kishida Chemical), 3.2 g of Aerosil R972 [trade name] ((1) hydrophobic silica; Nippon Aerosil), 1.3 g of Aerosil 200 [trade name] ((2) hydrophilic silica; Nippon Aerosil), and 0.5 g of 2-(4'-thiazolyl)benzimidazole [trade name] (SC Environmental Science). Nine grams of the resulting light-shielding paint was stirred with 0.1 g of EH-6019 epoxy resin curing agent [trade name] (ADEKA) using HM-500 planetary mixer [trade name] (Keyence) for 3 minutes.

The vapor pressure of the obtained light-shielding paint for optical elements at 20° C. was measured to be 1919 Pa under the above-described conditions.

Data on this light-shielding paint are presented in Table 2. The results of the visual inspection of the obtained light-shielding film and optical element for white spots and the assessment for ease of application are presented in Table 3.

Comparative Example 4

The following materials were stirred in a stirring vessel using HM-500 planetary mixer [trade name] (Keyence) for 20 minutes: 7.0 g of jER828 epoxy resin [trade name] (Mitsubishi Chemical), 40.0 g of ND139 titania dispersion [trade name] (TAYCA Corporation; a dispersion of titania in PGME; titania concentration, 25% by mass), 1.2 g of VALIFAST-BLACK 3810 [trade name] (dye (1); Orient Chemical Industries), 3.0 g of VALIFAST-RED 3320 [trade name] (dye (2); Orient Chemical Industries), 1.2 g of VALIFAST-YELLOW 3108 [trade name] (dye (3); Orient Chemical Industries), 3.8 g of VALIFAST-BLUE 2620 [trade name] (dye (4); Orient Chemical Industries), 17.0 g of 1-butoxy-2-propanol (an organic solvent; Kishida Chemical), 3.2 g of Aerosil R972 [trade name] ((1) hydrophobic silica; Nippon Aerosil), 1.3 g of Aerosil 200 [trade name] ((2) hydrophilic silica; Nippon Aerosil), and 0.5 g of 2-(4'-thiazolyl)benzimidazole [trade name] (SC Environmental Science). Nine grams of the resulting light-shielding paint was stirred with 0.1 g of EH-6019 epoxy resin curing agent [trade name] (ADEKA) using HM-500 planetary mixer [trade name] (Keyence) for 3 minutes.

The vapor pressure of the obtained light-shielding paint for optical elements at 20° C. was measured to be 997 Pa under the above-described conditions.

Data on this light-shielding paint are presented in Table 2. The results of the visual inspection of the obtained light-shielding film and optical element for white spots and the assessment for ease of application are presented in Table 3.

TABLE 1

| | | | | Example 1 | Example 2 | Example 3 |
|---|---|---|---|---|---|---|
| Light-shielding paint | Base component | Resin | Material | Epoxy | Epoxy | Epoxy |
| | | | Quantity (g) | 7 | 7 | 7 |
| | | Titania fine particles | Material | Titania (dispersed in propylene glycol monomethyl ether; 25 wt % solids) | Titania (dispersed in propylene glycol monomethyl ether; 25 wt % solids) | Titania (dispersed in propylene glycol monomethyl ether; 25 wt % solids) |
| | | | Quantity (g) | 10 | 10 | 10 |
| | | Coloring agents | Material | (1) Black dye (2) Red dye (3) Yellow dye (4) Blue dye | (1) Black dye (2) Red dye (3) Yellow dye (4) Blue dye | (1) Black dye (2) Red dye (3) Yellow dye (4) Blue dye |
| | | | Quantity (g) | (1) 1.2 (2) 3.0 (3) 1.2 (4) 3.8 | (1) 1.2 (2) 3.0 (3) 1.2 (4) 3.8 | (1) 1.2 (2) 3.0 (3) 1.2 (4) 3.8 |
| | | Organic solvent | Material | 1-Butoxy-2-propanol | 1-Butoxy-2-propanol | 2-Ethyl-1-hexanol |
| | | | Boiling point (° C.) | 170 | 170 | 185 |
| | | | Quantity (g) | 22 | 50 | 50 |
| | | Second fine particles | Material | (1) Hydrophobic silica (2) Hydrophilic silica | (1) Hydrophobic silica (2) Hydrophilic silica | (1) Hydrophobic silica (2) Hydrophilic silica |
| | | | Quantity (g) | (1) 3.2 (2) 1.3 | (1) 3.2 (2) 1.3 | (1) 3.2 (2) 1.3 |
| | | Additive | Material | Fungicide | Fungicide | Fungicide |
| | | | Quantity (g) | 0.5 | 0.5 | 0.5 |
| | Curing agent | | Material | Amine-based | Amine-based | Amine-based |
| | | | Quantity (g) | 0.1 | 0.1 | 0.1 |
| Vapor pressure at 20° C. (Pa) | | | | 960 | 850 | 480 |
| Viscosity at 20° C. (mPa · s) | | | | 35.8 | 14.3 | 44.5 |

| | | | | Example 4 | Example 5 |
|---|---|---|---|---|---|
| Light-shielding paint | Base component | Resin | Material | Epoxy | Epoxy |
| | | | Quantity (g) | 7 | 7 |
| | | Titania fine particles | Material | Titania (dispersed in propylene glycol monomethyl ether; 25 wt % solids) | Titania (dispersed in propylene glycol monomethyl ether; 25 wt % solids) |
| | | | Quantity (g) | 10 | 3 |
| | | Coloring agents | Material | (1) Black dye (2) Red dye (3) Yellow dye (4) Blue dye | (1) Black dye (2) Red dye (3) Yellow dye (4) Blue dye |
| | | | Quantity (g) | (1) 1.2 (2) 3.0 (3) 1.2 (4) 3.8 | (1) 1.2 (2) 3.0 (3) 1.2 (4) 3.8 |

TABLE 1-continued

|  |  |  | Organic solvent | Material | Butyl cellosolve | Benzyl alcohol |
|---|---|---|---|---|---|---|
|  |  |  |  | Boiling point (° C.) | 171 | 205 |
|  |  |  |  | Quantity (g) | 50 | 60 |
|  |  |  | Second fine particles | Material | (1) Hydrophobic silica (2) Hydrophilic silica | (1) Hydrophobic silica (2) Hydrophilic silica |
|  |  |  |  | Quantity (g) | (1) 3.2 (2) 1.3 | (1) 3.2 (2) 1.3 |
|  |  |  | Additive | Material | Fungicide | Fungicide |
|  |  |  |  | Quantity (g) | 0.5 | 0.5 |
|  |  |  | Curing agent | Material | Amine-based | Amine-based |
|  |  |  |  | Quantity (g) | 0.1 | 0.1 |
|  |  |  | Vapor pressure at 20° C. (Pa) |  | 513 | 168 |
|  |  |  | Viscosity at 20° C. (mPa · s) |  | 33.9 | 47.0 |

TABLE 2

|  |  |  |  |  | Comparative Example 1 | Comparative Example 2 |
|---|---|---|---|---|---|---|
| Light-shielding paint | Base component | Resin | Material | | Epoxy | Epoxy |
|  |  |  | Quantity (g) | | 7 | 7 |
|  |  | Titania fine particles | Material | | Titania (dispersed in propylene glycol monomethyl ether; 25 wt % solids) | Titania (dispersed in propylene glycol monomethyl ether; 25 wt % solids) |
|  |  |  | Quantity (g) | | 3 | 10 |
|  |  | Coloring agents | Material | | (1) Black clye (2) Red dye (3) Yellow dye (4) Blue dye | (1) Black dye (2) Red dye (3) Yellow dye (4) Blue dye |
|  |  |  | Quantity (g) | | (1) 1.2 (2) 3.0 (3) 1.2 (4) 3.8 | (1) 1.2 (2) 3.0 (3) 1.2 (4) 3.8 |
|  |  | Organic solvent | Material | | Hexamethylphosphoric triamide | Propylene glycol monomethyl ether |
|  |  |  | Boiling point (° C.) | | 235 | 119 |
|  |  |  | Quantity (g) | | 65 | 22 |
|  |  | Second fine particles | Material | | (1) Hydrophobic silica (2) Hydrophilic silica | (1) Hydrophobic silica (2) Hydrophilic silica |
|  |  |  | Quantity (g) | | (1) 3.2 (2) 1.3 | (1) 3.2 (2) 1.3 |
|  |  | Additive | Material | | Fungicide | Fungicide |
|  |  |  | Quantity (g) | | 0.5 | 0.5 |
|  |  | Curing agent | Material | | Amine-based | Amine-based |
|  |  |  | Quantity (g) | | 0.1 | 0.1 |
|  | Vapor pressure at 20° C. (Pa) |  |  |  | 150 | 1200 |
|  | Viscosity at 20° C. (mPa · s) |  |  |  | 6.1 | 25.0 |
|  |  |  |  |  | Comparative Example 3 | Comparative Example 4 |
| Light-shielding paint | Base component | Resin | Material | | Epoxy | Epoxy |
|  |  |  | Quantity (g) | | 7 | 7 |
|  |  | Titania fine particles | Material | | Titania (dispersed in propylene glycol monomethyl ether; 25 wt % solids) | Titania (dispersed in propylene glycol monomethyl ether; 25 wt % solids) |
|  |  |  | Quantity (g) | | 10 | 10 |
|  |  | Coloring agents | Material | | (1) Black dye (2) Red dye (3) Yellow dye (4) Blue dye | (1) Black dye (2) Red dye (3) Yellow dye (4) Blue dye |
|  |  |  | Quantity (g) | | (1) 1.2 (2) 3.0 (3) 1.2 (4) 3.8 | (1) 1.2 (2) 3.0 (3) 1.2 (4) 3.8 |

TABLE 2-continued

| | | | | |
|---|---|---|---|---|
| Organic solvent | Material | | Toluene | 1-Butoxy-2-propanol |
| | Boiling point (° C.) | | 111 | 170 |
| | Quantity (g) | | 22 | 17 |
| Second fine particles | Material | | (1) Hydrophobic silica<br>(2) Hydrophilic silica | (1) Hydrophobic silica<br>(2) Hydrophilic silica |
| | Quantity (g) | | (1) 3.2<br>(2) 1.3 | (1) 3.2<br>(2) 1.3 |
| Additive | Material | | Fungicide | Fungicide |
| | Quantity (g) | | 0.5 | 0.5 |
| Curing agent | Material | | Amine-based | Amine-based |
| | Quantity (g) | | 0.1 | 0.1 |
| Vapor pressure at 20° C. (Pa) | | | 1919 | 997 |
| Viscosity at 20° C. (mPa · s) | | | 32.5 | 58.7 |

TABLE 3

| | Vapor pressure of light-shielding paint (Pa, at 20° C.) | White spot inspection | | Ease of application assessment | |
|---|---|---|---|---|---|
| | | Appearance | White spot count | Ease of application | Displacement (mm) |
| Example 1 | 960 | A | 300 | A | 0.32 |
| Example 2 | 850 | A | 268 | A | 0.39 |
| Example 3 | 480 | A | 160 | A | 0.58 |
| Example 4 | 513 | A | 182 | A | 0.64 |
| Example 5 | 168 | A | 107 | A | 0.90 |
| Comparative Example 1 | 150 | B | 105 | C | 1.86 |
| Comparative Example 2 | 1200 | C | 850 | A | 0.22 |
| Comparative Example 3 | 1919 | C | 2300 | A | 0.13 |
| Comparative Example 4 | 997 | B | 312 | A | 0.32 |

Results

In Examples 1 to 6, the light-shielding paints having a vapor pressure of 160 Pa or more and 960 Pa or less at 20° C. sufficiently filled cracks in an edge surface of the optical elements, preventing white spots from occurring on the light-shielding films formed through the application of the paints. The uniformity of the coatings of the light-shielding paints in Examples 1 to 6, furthermore, allowed the production of light-shielding films with good appearance and preserved performance in shielding light and optical elements having them.

In Comparative Example 1, however, white spots were few in number, but the paint did not form a uniform light-shielding film because of an increased displacement. Furthermore, residue of the organic solvent in the light-shielding film affected the chemical resistance of the film in Comparative Example 1. In Comparative Examples 2 to 4, the vapor pressure of the light-shielding paints at 20° C. as high as more than 960 Pa led to insufficient filling of cracks in an edge surface of the optical elements, resulting in a large number of white spots.

Optical elements according to an aspect of the present invention having a light-shielding film can be applied to optical equipment such as cameras, binoculars, and semiconductor exposure devices.

Advantages

An aspect of the present invention provides a light-shielding paint that produces a light-shielding film with few white spots noticeable on the element-film interface (the interface between the light-shielding film and the optical element on which it has been formed) viewed from the optical element side. Some other aspects of the present invention provide such a light-shielding film and an optical element having such a light-shielding film.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A light-shielding paint comprising:
an epoxy resin;
fine particles of titania;
a dye;
an organic solvent includes a first organic solvent and a second organic solvent; and
an amine-based hardener,
wherein the first organic solvent is at least one selected from benzyl alcohol, 2-ethyl-1-hexanol, butyl cellosolve, and 1-Butoxy-2-propanol,
wherein the second organic solvent is propylene glycol monomethyl ether, and
wherein the organic solvent has a vapor pressure of 160 Pa or more and 960 Pa or less at a temperature of 20° C.

2. The light-shielding paint according to claim 1, wherein a viscosity of the light-shielding paint is 10.0 mPas or more and 100 mPas or less.

3. The light-shielding paint according to claim 1, wherein the epoxy resin is a bisphenol A epoxy resin.

4. The light-shielding paint according to claim 1, wherein an average particle diameter of primary particles of the fine particles of titania is 100 nm or less.

5. The light-shielding paint according to claim 1, wherein a boiling point of the first organic solvent is 150° C. or more and 210° C. or less.

6. The light-shielding paint according to claim 1, wherein a total quantity of the first organic solvent and the second organic solvent is 5.0% by mass or more and 70.0% by mass or less.

7. The light-shielding paint according to claim 1, wherein a ratio of a quantity of the first organic solvent to a quantity of the second organic solvent is 73.3% by mass or more and 666.7% by mass or less.

8. The light-shielding paint according to claim 1, further comprising second inorganic fine particles other than the fine particles of titania,
wherein a quantity of the second inorganic fine particles is 2.0% by mass or more and 20.0% by mass or less.

9. The light-shielding paint according to claim 8, wherein the second inorganic fine particles are Hydrophobic silica and Hydrophilic silica.

10. The light-shielding paint according to claim 8, wherein a quantity of the fine particles of titania is 20.0% by mass or more and 60.0% by mass or less.

11. An optical element comprising:
a glass substrate having a surface, and
a light-shielding film being configured to on the surface of the glass substrate,
wherein the light-shielding film is made of a cured product of the light-shielding paint according to claim 1.

12. A light-shielding paint set for an optical element, the light-shielding paint set comprising:
two or more units including:
a unit having an epoxy resin; and
a unit having an amine-based hardener, wherein
the light-shielding paint set contains fine particles of titania, a dye, and an organic solvent includes a first organic solvent and a second organic solvent in any one or more of the units,
wherein the first organic solvent in a light-shielding paint as a mixture of all units in the light-shielding paint set is at least one selected from benzyl alcohol, 2-ethyl-1-hexanol, butyl cellosolve, and 1-butoxy-2-propanol,
wherein the second organic solvent is propylene glycol monomethyl ether, and
wherein the organic solvent in a light-shielding paint as a mixture of all units in the light-shielding paint set has a vapor pressure of 160 Pa or more and 960 Pa or less at a temperature of 20° C.

13. The light-shielding paint set according to claim 12, wherein
a viscosity of the light-shielding paint as a mixture of all units in the light-shielding paint set is 10.0 mPa·s or more and 100 mPa·s or less.

14. An optical equipment to which the light-shielding paint of the light-shielding paint set according to claim 12 has been applied.

15. Optical equipment comprising:
the optical element according to claim 14.

16. The optical element according to claim 11, wherein white spots are present in an interface between the substrate and the light-shielding film, and wherein a number of the white spots is 300 or less in an arbitrary area of 6 mm² in the interface.

17. Optical equipment comprising the optical element according to claim 11.

* * * * *